US012407495B2

(12) United States Patent
Hillier et al.

(10) Patent No.: US 12,407,495 B2
(45) Date of Patent: Sep. 2, 2025

(54) ENCRYPTION KEYS FROM STORAGE SYSTEMS

(71) Applicant: HEWLETT PACKARD ENTERPRISE DEVELOPMENT LP, Houston, TX (US)

(72) Inventors: Christopher Anthony Grant Hillier, Ft. Collins, CO (US); Curtis C. Ballard, Eaton, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 765 days.

(21) Appl. No.: 17/019,764

(22) Filed: Sep. 14, 2020

(65) Prior Publication Data

US 2022/0085983 A1  Mar. 17, 2022

(51) Int. Cl.
*H04L 9/08* (2006.01)

(52) U.S. Cl.
CPC ............ *H04L 9/0825* (2013.01); *H04L 9/083* (2013.01); *H04L 9/0866* (2013.01); *H04L 9/0894* (2013.01)

(58) Field of Classification Search
None
See application file for complete search history.

(56) References Cited

U.S. PATENT DOCUMENTS

| 6,708,272 | B1* | 3/2004 | McCown | H04L 9/083 380/278 |
| 8,295,490 | B1* | 10/2012 | McCoy | G06F 21/6218 380/279 |
| 8,417,967 | B2 | 4/2013 | Foster et al. | |
| 9,031,233 | B2* | 5/2015 | Kang | H04L 9/0894 713/176 |
| 9,830,278 | B1* | 11/2017 | Harwood | H04L 63/061 |
| 9,954,678 | B2* | 4/2018 | Mosko | H04L 67/63 |
| 9,973,481 | B1* | 5/2018 | Sharifi Mehr | H04L 9/0825 |
| 10,372,926 | B1* | 8/2019 | Leshinsky | H04L 9/083 |
| 10,402,573 | B1* | 9/2019 | Galligan | H04L 63/0807 |
| 10,963,593 | B1* | 3/2021 | Campagna | H04L 9/0861 |
| 2003/0041221 | A1 | 2/2003 | Okada et al. | |
| 2005/0089165 | A1 | 4/2005 | Kitani et al. | |
| 2005/0091491 | A1* | 4/2005 | Lee | H04L 9/0825 |
| 2006/0050870 | A1* | 3/2006 | Kimmel | H04L 9/3247 380/30 |

(Continued)

OTHER PUBLICATIONS

Amazon Web Services, Inc., "Protecting data using encryption," retrieved Aug. 19, 2020, Amazon Simple Storage Service, Developer Guide, API Version Mar. 1, 2006, pp. 279-313.

(Continued)

*Primary Examiner* — Rupal Dharia
*Assistant Examiner* — Shadi H Kobrosli
(74) *Attorney, Agent, or Firm* — Trop, Pruner & Hu, P.C.

(57) ABSTRACT

In some examples, a storage system includes a controller to receive a request for a data encryption key from the host system, in response to the request, retrieve, from a key manager system, the data encryption key for the host system, and encrypt the data encryption key retrieved from the key manager system using a first key, to produce an encrypted data encryption key. The controller sends the encrypted data encryption key to the host system, and receives, from the host system, encrypted data encrypted using the data encryption key.

19 Claims, 4 Drawing Sheets

(56) References Cited

U.S. PATENT DOCUMENTS

| | | | | |
|---|---|---|---|---|
| 2008/0260159 | A1* | 10/2008 | Osaki | H04L 63/0464 380/277 |
| 2008/0294894 | A1* | 11/2008 | Dubhashi | G06F 21/10 713/168 |
| 2009/0067633 | A1* | 3/2009 | Dawson | H04L 9/0822 380/279 |
| 2013/0227303 | A1* | 8/2013 | Kadatch | H04L 9/0894 713/193 |
| 2014/0310536 | A1 | 10/2014 | Shacham | |
| 2018/0225179 | A1 | 8/2018 | Donaghy et al. | |
| 2019/0097791 | A1* | 3/2019 | Hersans | H04L 9/0894 |
| 2019/0296896 | A1* | 9/2019 | Resch | H04L 9/0819 |
| 2020/0067699 | A1* | 2/2020 | Resch | G09C 1/00 |
| 2020/0076580 | A1* | 3/2020 | Driever | H04L 63/0823 |
| 2020/0076585 | A1* | 3/2020 | Sheppard | H04L 9/3273 |
| 2021/0036851 | A1* | 2/2021 | Villapakkam | G06F 21/602 |
| 2021/0184840 | A1* | 6/2021 | Yeo | G06F 16/93 |
| 2021/0334416 | A1* | 10/2021 | Jung | G06F 21/79 |
| 2022/0069983 | A1* | 3/2022 | Yoshida | H04L 9/12 |
| 2024/0171381 | A1* | 5/2024 | Shveykin | H04L 9/14 |

OTHER PUBLICATIONS

Amazon Web Services, Inc., "Security in Amazon EFS," retrieved Aug. 19, 2020, Amazon Elastic File System, User Guide, pp. 140-144.

Amazon; "How Amazon Elastic Block Store (Amazon EBS) Uses AWS KMS"; 4 pages printed on Oct. 22, 2019 from webpage: https://docs.aws.amazon.com/kms/latest/developerguide/services-ebs.html.

Canonical Ltd., "nvme-security-recv—Security Recv command," Ubuntu Manpage, <http://manpages.ubuntu.com/manpages/xenial/man1/nvme-security-recv.1.html>, Retrieved Aug. 27, 2020 (3 pages).

Gemalto, Product Brief, SafeNet KeySecure™ downloaded Jul. 28, 2020 (2 pages).

HP Enterprise Secure Key Manager 4.0, Datasheet, Manage business-critical encryption keys for OASIS KMIP clients, Feb. 2014 (4 pages).

IBM Research Lab in Haifa, "Capability based Command Security," Feb. 2007, SCSI commands standard proposal, 07-069r1, pp. i-iii and 1-46.

Jim Hatfield, "Assignments for Trusted Computing Group," Feb. 22, 2006, e05139r7, <http://www.t13.org/documents/UploadedDocuments/docs2006/e05139r7-ACS-TrustedComputingCommands.pdf> (13 pages).

Systutorials, "nvme-security-send (1)—Linux Man Pages," retrieved Aug. 27, 2020, <http://manpages.ubuntu.com/manpages/xenial/man1/nvme-security-recv.1.html> (2 pages).

Trusted Computing Group, Incorporated, "TCG Storage Interface Interactions Specification (SIIS)," Specification Version 1.08, Revision 1.00, Oct. 26, 2018, pp. i-vii and 1-51.

Amazon Web Services, "Protecting data using client-side encryption," Aug. 8, 2020, <http://web.archive.org/web/20200808162333/http://docs.aws.amazon.com/AmazonS3/latest/dev/UsingClientSideEncryption.html>, 5 pages.

Chalmers et al., "What exactly is client-side encryption?," 2017, Stack Exchange, <https://security.stackexchange.com/questions/176376/what-exactly-is-client-side-encryption>, 3 pages.

Hewlett Packard Enterprise Development LP, "Encryption technology for HPE StoreEver LTO Ultrium Tape Drives," Dec. 2015, Rev. 1, <https://www.tapetember.com/portals/0/tapetember/lto-7/4aa5-2801enw.pdf>, 19 pages.

NVM Express Workgroup, "NVM Express™: Base Specification," Revision 1.4, Jun. 10, 2019, <https://nvmexpress.org/wp-content/uploads/NVM-Express-1_4-2019.06.10-Ratified.pdf>, 403 pages.

Scott Schweitzer, "Why is a SmartNIC Better than a Regular NIC?," Jun. 30, 2020, Electronic Design, <https://www.electronicdesign.com/markets/automation/article/21134459/xilinx-why-is-a-smartnic-better-than-a-regular-nic>, 9 pages.

Seagate Technology LLC, "SCSI Commands Reference Manual," Oct. 2016, 100293068, Rev. J, <https://www.seagate.com/files/staticfiles/support/docs/manual/Interface%20manuals/100293068j.pdf>. 518 pages.

Wikipedia, "Capability-based security," Aug. 16, 2020, <https://en.wikipedia.org/w/index.php?title=Capability-based_security&oldid=973273333>, 5 pages.

Wikipedia, "Data Encryption Standard," Aug. 28, 2020, <https://en.wikipedia.org/w/index.php?title=Data_Encryption_Standard&oldid=975385193>, 16 pages.

Wikipedia, "IPsec," Aug. 31, 2020, <https://en.wikipedia.org/w/index.php?title=IPsec&oldid=975901389>, 8 pages.

Wikipedia, "Key Management Interoperability Protocol," Feb. 10, 2020, <https://en.wikipedia.org/w/index.php?title=Key_Management_Interoperability_Protocol&oldid=940121133>. 5 pages.

Wikipedia, "RSA (cryptosystem)," Aug. 19, 2020, <https://en.wikipedia.org/w/index.php?title=RSA_(cryptosystem)&oldid=973884875>, 18 pages.

Wikipedia, "Trusted Platform Module," Aug. 31, 2020, <https://en.wikipedia.org/w/index.php?title=Trusted_Platform_Module&oldid=975959444>. 13 pages.

\* cited by examiner

ENCRYPTION KEYS FROM STORAGE SYSTEMS

BACKGROUND

Data stored in a storage system can be encrypted to protect the data from being accessed by unauthorized entities. Data can be encrypted using a data encryption key. To reduce risk to the data, the data can be protected in-flight (as the data is communicated over a network) and at rest (when the data is stored in a storage medium of the storage system).

BRIEF DESCRIPTION OF THE DRAWINGS

Some implementations of the present disclosure are described with respect to the following figures.

Figure 1:
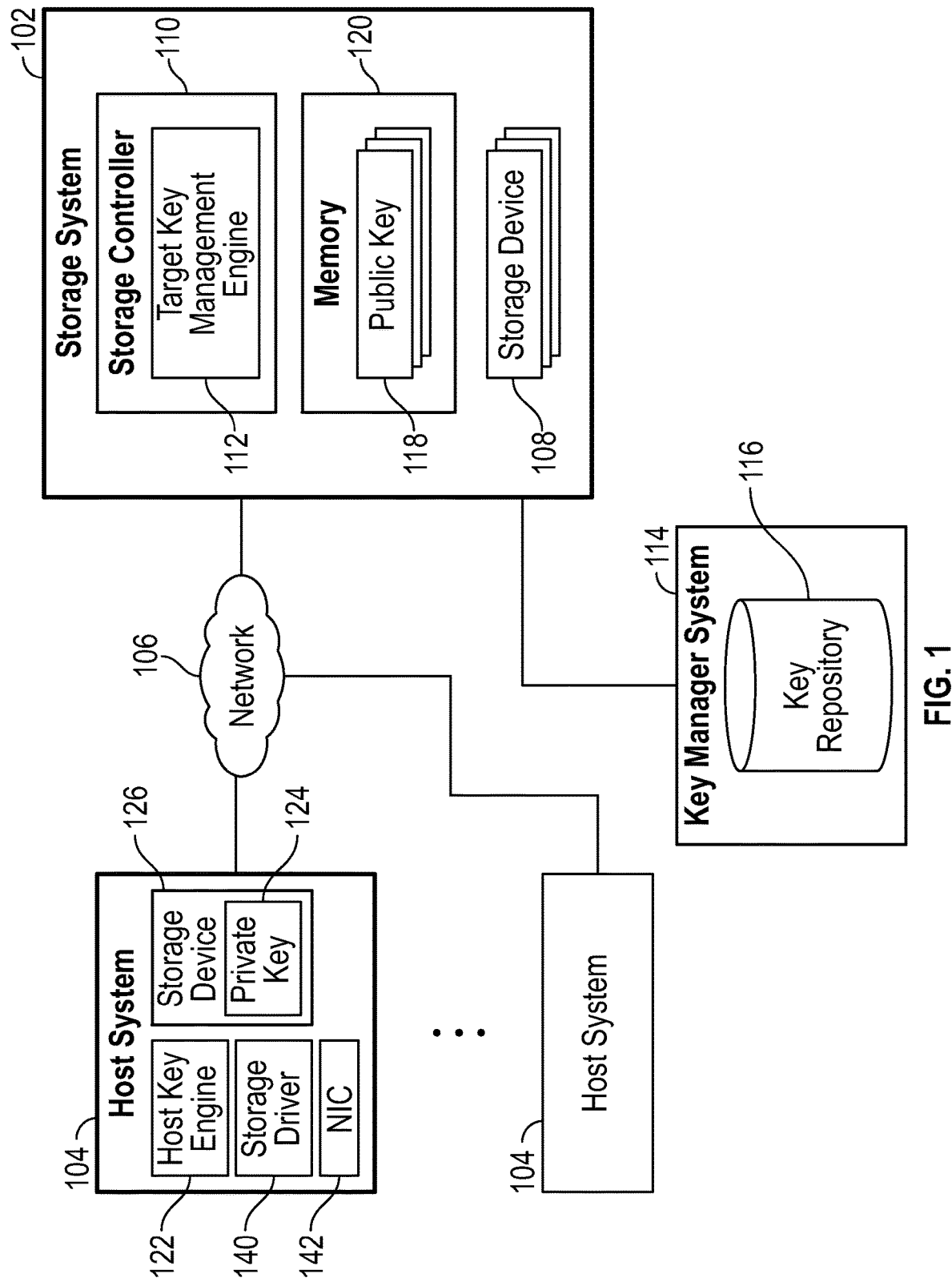
FIG. 1 is a block diagram of an arrangement that includes a storage system, host systems, and a key manager system, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Several distinct approaches may be employed to provide for encryption of data. A first approach involves controlling encryption of data at the storage system. With the first approach, data is encrypted by the storage system and stored in a storage medium of the storage system in encrypted form. However, data sent to the storage system, such as from a host system, is not protected in-flight. As a result, the unencrypted data in-flight may be exposed to attackers, including unauthorized users, malware, and so forth.

A host system includes a computing device (or multiple computing devices) that is (are) able to issue requests to access data stored in a storage medium of the storage system. A host system may also be referred to as an initiator system. A host system can include any or some combination of: a desktop computer, a notebook computer, a tablet computer, a server computer, a smart phone, an Internet-of-Things (IoT) device, a vehicle or a controller in a vehicle, a communication node, or any other type of electronic device.

A storage system can refer to a computing device (or multiple computing devices) that manage(s) access of data stored in a storage medium. A storage medium can include a storage device or multiple storage devices, where a storage device can include a disk-based storage device, a solid-state storage device, and so forth.

A variant of the first approach may allow for in-flight data encryption, such as by using a security protocol that governs data communications over a network. For example, a security protocol includes Internet Protocol Security (IPSec) or another security protocol. In the variant of the first approach, data is encrypted by a transport layer of the host system using a first data encryption key prior to communication over the network, and the encrypted data is communicated over the network to the storage system. At the storage system, the received encrypted data is decrypted, and the decrypted data is then encrypted using a second data encryption key to produce further encrypted data. The further encrypted data is then stored in a storage medium of the storage system. The process of encrypting data, transmitting the encrypted data, decrypting encrypted data at the storage system, and re-encrypting the decrypted data adds to the complexity of a data store operation initiated by the host system towards the storage system. Also, the multiple operations involved can add to the latency associated with the data store operation.

A second approach involves controlling encryption of data at an application layer of the host system using a data encryption key managed by the host system. With the second approach, it is possible to use one data encryption key for data-in-flight (data communicated over a network) and data-at-rest (data stored in a storage medium of the storage system). However, in a computing environment with a large number of host systems, complexity is increased since the different host systems may employ different data encryption keys, and one host system may have a requirement to access another host system's data encryption key to access encrypted data. In some cases, security mechanisms may prohibit sharing of data encryption keys between host systems. In other examples, the multiple host systems may each have to register with a key manager system, which can be complex when there is a large number of host systems.

In accordance with some implementations of the present disclosure, encryption key management is provided by a storage system while still allowing for the use of a common data encryption key for both data-in-flight (between a host system and the storage system) and data-at-rest (data stored by the storage system). The storage system receives a request for a data encryption key from a host system, and in response to the request, retrieves, from a key manager system, a data encryption key for the host system. The data encryption key can be associated with the individual host system or can be associated with a cluster of host systems. In some examples, a first data encryption key associated with a first individual host system or a first cluster of host systems is different from a second data encryption key associated with a second individual host system or a second cluster of host systems. A data encryption key associated with an individual host system can be associated with an identifier of the individual host system. A data encryption key associated with a cluster of host systems can be associated with an identifier of the cluster of host systems. An "identifier" can refer to any or some combination of: a network address, a name, a hardware identifier, a serial number, a uniform resource locator (URL), and so forth.

Alternatively, a data encryption key can be associated with a storage object or a collection of storage objects. A "storage object" can refer to any individually accessible amount of storage, such as a storage space identified by a logical unit number (LUN), a network address, a namespace, and so forth. In some examples, a first data encryption key associated with a first individual storage object or a first collection of storage objects is different from a second data encryption key associated with a second individual storage object or a second collection of storage objects.

More generally, in some examples, different data encryption keys are associated with different host systems, different clusters of host systems, different storage objects, or different collections of storage objects.

The storage system encrypts the data encryption key using a first key (such as a public key of the host system), to produce an encrypted data encryption key. The first key can also be referred to as a "key encryption key." The storage system sends the encrypted data encryption key to the host system. The encrypted data encryption key can be decrypted using a second key (such as a private key of the host system). The storage system receives, from the host system, encrypted data encrypted using the data encryption key.

In some examples where the first key is a public key and the second key is a private key, the public key and private key are part of a public-private key pair. An example of an algorithm that can be used to produce a public-private key pair includes a Rivest-Shamir-Adleman (RSA) algorithm. In other examples, other types of algorithms for producing public-private key pairs can be employed.

FIG. 1 is a block diagram of an example arrangement that includes a storage system 102, and host systems 104 that are able to access (read or write) data stored by the storage system 102. Example storage systems 102 may include storage arrays, storage appliances, or the like.

The host systems 104 are able to communicate with the storage system 102 over a network 106. Examples of the network 106 can include any or some combination of the following: a local area network (LAN), a wide area network (WAN), a storage area network (SAN), a public network such as the Internet, and so forth. The network 106 can be implemented using a wired network and/or a wireless network.

In some examples, a host system 104 is able to send Small Computer System Interface (SCSI) commands to the storage system 102 to access data. In other examples, a host system 104 is able to send NON-VOLATILE MEMORY EXPRESS (NVMe™) commands to access data of the storage system 102. In further examples, a host system 104 can send commands according to other protocols (whether standardized, proprietary, or open-source) to the storage system 102 to access data of the storage system 102.

The storage system 102 is associated with a storage device 108 (or multiple storage devices). A "storage device" can refer to a disk-based storage device, a solid-state storage device, and so forth. In some examples, the storage device(s) 108 is (are) part of the storage system 102. In other examples, the storage device(s) 108 is (are) external of the storage system 102, but is (are) connected to the storage system 102 over a communication link.

The storage system 102 includes a storage controller 110 that manages the access of data in the storage device(s) 108 in response to commands received from the host systems 104. The storage controller 110 can manage reading of data from the storage device(s) 108, or writing of data to the storage device(s) 108.

As used here, a "controller" can refer to a hardware processing circuit, which can include any or some combination of a microprocessor, a core of a multi-core microprocessor, a microcontroller, a programmable integrated circuit, a programmable gate array, or another hardware processing circuit. Alternatively, a "controller" can refer to a combination of a hardware processing circuit and machine-readable instructions (software and/or firmware) executable on the hardware processing circuit.

In some examples, the storage controller 110 includes a target key management engine 112 according to some implementations of the present disclosure. The target key management engine 112 can be implemented using a portion of the hardware processing circuit of the storage controller 110, or alternatively, as machine-readable instructions executable by the storage controller 110.

Although FIG. 1 shows the target key management engine 112 as being part of the storage controller 110, in other examples, the target key management engine 112 can be implemented as part of a controller that is separate from the storage controller 110.

The target key management engine 112 manages access to and retrieval of data encryption keys to be used for encrypting data-in-flight between host systems 104 and the storage system 102, as well as data-at-rest stored in the storage device(s) 108. More specifically, for a given host system 104, a given cluster of host systems 104, a given storage object, or a given collection of storage objects, the target key management engine 112 can provide a data encryption key that is to be used for both data-in-flight encryption and the data-at-rest encryption. Generation of data encryption keys can be performed using any of various different encryption key generation techniques.

In some examples, the data encryption key can be unique to an individual host system, unique to a cluster of host systems, unique to an individual storage object, or unique to a collection of storage objects. In such examples, a data encryption key for a first host system can be different from a data encryption key for a second host system, or a data encryption key for a first cluster of host systems can be different from a data encryption key for a second cluster of host systems, or a data encryption key for a first storage object can be different from a data encryption key for a second storage object, or a data encryption key for a first collection of storage objects can be different from a data encryption key for a second collection of storage objects.

In other examples, data encryption keys do not have to be unique across host systems (or clusters of storage systems) or storage objects (or collections of storage objects).

In some examples, a given host system 104 can send a request for a data encryption key to the storage system 102. The request can include an identifier associated with the given host system 104 or an identifier associated with a storage object to be accessed. The identifier associated with the given host system 104 can include a name of the given host system 104, a network address of the given host system 104, a hardware identifier of the given host system 104, a serial number of the given host system 104, a URL of the given host system 104, a worldwide name of the given host system 104, an NVMe qualified name of the given host system 104, a universally unique identifier (UUID) (described in Request for Comments 4122, entitled "A Universally Unique Identifier (UUID) URN Namespace," dated July 2005), or any other information that can provide some form of identification of the given host system 104. An identifier associated with a storage object can include a name of the storage object, a URL of the storage object, and so forth.

Note further that an identifier associated with a host system can refer to an identifier of an individual host system or an identifier of a cluster of host systems, and an identifier associated with a storage object can refer to an identifier of an individual storage object or an identifier of a collection of storage objects.

Based on the identifier associated with the given host system 104 or the identifier associated with the storage object that is to be accessed, the target key management engine 112 can retrieve, from a key manager system 114, a data encryption key corresponding to the identifier associated with the host system or storage object.

The key manager system 114 can maintain a key repository 116 that contains data encryption keys. The key repository 116 can correlate different key identifiers with respective data encryption keys. The key identifiers correlated by the key repository 116 with respective data encryption keys may be the identifiers associated with host systems or storage objects listed above, or may be determined (e.g., translated, looked up, etc.) based on identifiers associated with host systems or storage objects. The key repository 116 can be stored in a storage device or multiple storage devices, which can be part of the key manager system 114 or separate from the key manager system 114. The key manager system 114 can be implemented using a computing device or multiple computing devices, and is separate from the storage system 102.

The key manager system 114 can be connected to the storage system 102 over a communication link, such as the network 106 or another communication link. Generally, a key manager system is used to securely store data encryption keys to protect the data encryption keys from unauthorized access and from data loss. Examples of key manager systems include Utimaco Enterprise Security Key Manager™ (ESKM) from Utimaco, KeySecure™ from Thales, and so forth. Although examples of key manager systems are listed, it is noted that in other examples, different key manager systems can be employed.

In some examples, in response to a request for a data encryption key received from a host system 104, the target key management engine 112 sends a key identifier to the key manager system 114, which retrieves the corresponding data encryption key from the key repository 116 based on correlating the key identifier to the corresponding data encryption key. As noted above, the key identifier may be an identifier associated with a host system or storage object included in the request, or alternatively, the key identifier may be translated from the identifier associated with a host system or storage object, or looked up based on the identifier associated with a host system or storage object, or determined in a different way.

The key manager system 114 returns the data encryption key to the target key management engine 112, which then encrypts the data encryption key received from the key manager system 114 using a corresponding public key 118 associated with the given host system 104. As shown in FIG. 1, a memory 120 stores public keys 118 associated with respective different host systems 104. The public keys may have been provided by the respective host systems 104 to the storage system 102 for storing in the memory 120. Alternatively, the public keys 118 may have been received from entities different from the host systems 104.

The memory 120 can be implemented using any of various different types of memory devices, including a volatile memory device such as a dynamic random access memory (DRAM), a static random access memory (SRAM), and so forth, and/or a non-volatile memory device, such as a flash memory device and so forth.

The encrypted data encryption key is sent by the target key management engine 112 over the network 106 to the given host system 104. As shown in FIG. 1, each host system 104 includes a respective host key engine 122. The host key engine 122 can refer to a hardware processing circuit, which can include any or some combination of a microprocessor, a core of a multi-core microprocessor, a microcontroller, a programmable integrated circuit, a programmable gate array, or another hardware processing circuit. Alternatively, the host key engine 122 can refer to a combination of a hardware processing circuit and machine-readable instructions (software and/or firmware) executable on the hardware processing circuit.

The host key engine 122 in the given host system 104 decrypts the received encrypted data encryption key using a private key 124 of the given host system 104. The private key 124 can be stored in a storage device 126 of the host system 104. The storage device 126 can be implemented using a disk-based storage device, a solid-state storage device, and so forth. Alternatively, instead of storing the private key 124 in a storage device, the private key 124 can instead be stored in a non-volatile memory device.

Once the encrypted data encryption key received by the given host system 104 is decrypted by the host key engine 122, the decrypted data encryption key can be used to either encrypt data to be written to the storage system 102, or alternatively, can be used to decrypt encrypted data read from the storage system 102.

In some examples, the host key engine 122 can be part of either a storage driver 140 or a network interface controller (NIC) 142 of the host system 104. The storage driver 140 may be part of the operating system (OS) of the host system 104. The NIC 142 may be a smart NIC that includes a processor to perform intelligent tasks in addition to communication of data over the network 106. For example, the smart NIC can receive the encrypted data encryption key from the storage system 102, decrypt the data encryption key, and use the decrypted data encryption key in write and read operations without higher layers (including the OS or an application program) being aware of the data encryption or decryption.

Figure 2:
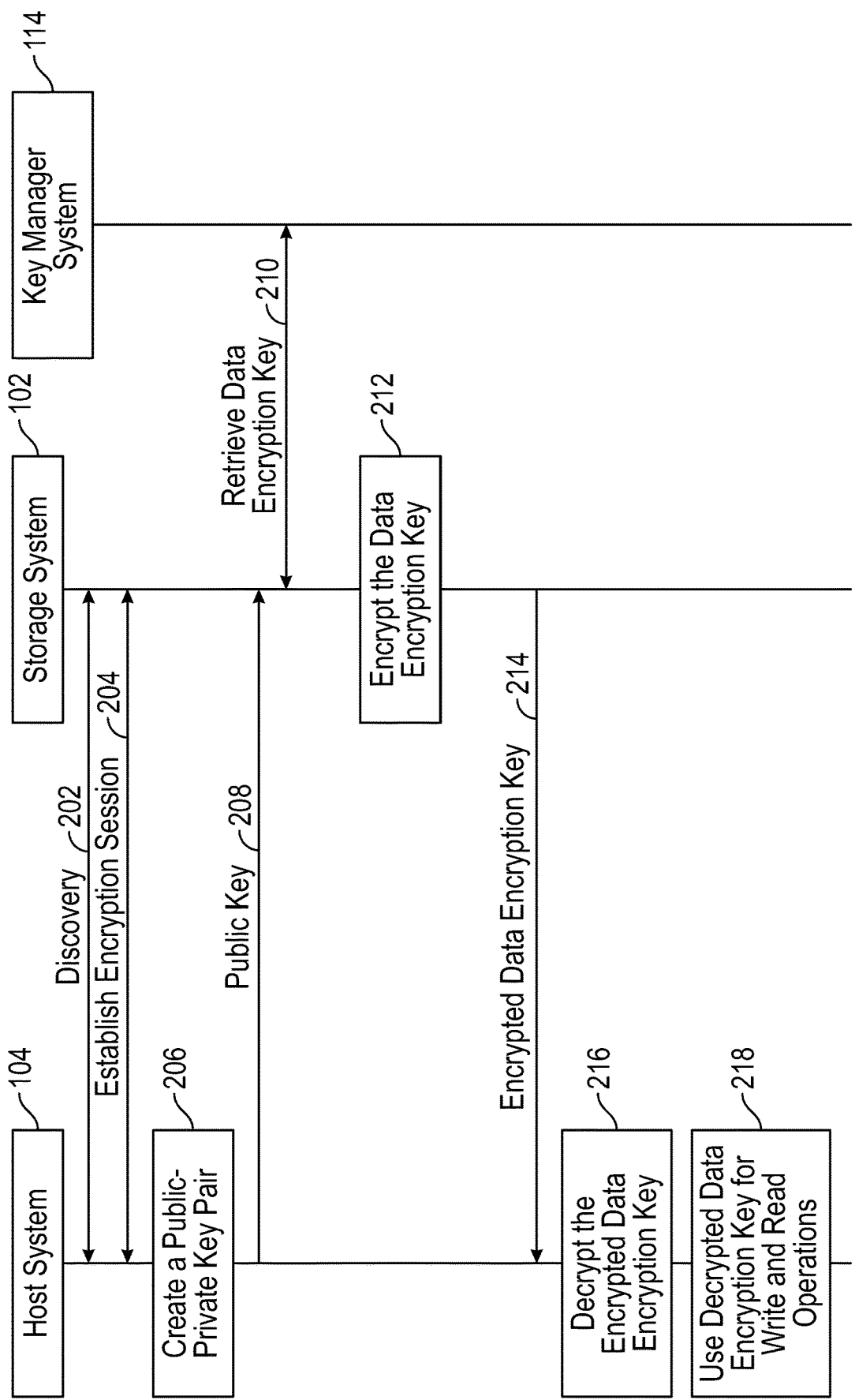
FIG. 2 is a message flow diagram of a process according to some examples.

FIG. 2 is a message flow diagram of an example process according to some implementations of the present disclosure. The host system 104 can perform discovery (at 202) of the storage system 102. The discovery can include an exchange of information in which the storage system 102 can send information that advertises an identifier of the storage system 102 and capabilities of the storage system 102. For example, as part of the discovery, the host key engine 122 in the host system 104 can discover that the storage system 102 supports a key encryption capability according to some implementations of the present disclosure, in which the storage system 102 is able to manage a data encryption key for encrypting both data-in-flight and data-at-rest. The information indicating support for the key encryption capability can be part of a message, an information element, and so forth.

Based on the discovery, the host system 104 establishes (at 204) an encryption session with the storage system 102. The "encryption session" refers to a communication session in which an encryption key (or multiple encryption keys) is (are) exchanged.

In some examples, the host key engine 122 in the host system 104 creates (at 206) a public-private key pair that includes a public key and a private key. In other examples, a public-private key pair may be created by a different entity and provided to the host system 104, either as an entire key pair or the public or private key individually.

The host key engine 122 in the host system 104 sends (at 208) the public key to the target key management engine 112 in the storage system 102. In some examples, the public key can be included in a field of a SCSI command, an NVMe™ command, or any other type of message. The message carrying the public key can include an identifier associated with the host system 104 or an identifier associated with a storage object to be accessed. Alternatively, the identifier associated with the host system or the storage object may be sent, from the host key engine 122 to the target key management engine 112, in a different message (different from the message carrying the public key).

The received public key can be stored by the target key management engine 112 for later use. For example, the public key can be stored in the memory 120 of the storage system 102.

Based on the identifier received from the host key engine 122, the target key management engine 112 retrieves (at 210) a corresponding data encryption key from the key manager system 114. The retrieval of the corresponding data encryption key can be accomplished by the target key management engine 112 in the storage system 102 sending a key identifier (discussed above) to the key manager system 114. The key identifier is mapped to the corresponding data encryption key in the key repository 116 (FIG. 1). The corresponding data encryption key is retrieved from the key repository 116 by the key manager system 114, which sends the corresponding data encryption key to the storage system 102. In some examples, multiple data encryption keys may be associated with a key identifier. The data encryption key returned by the key manager system 114 in response to the key identifier may be one of the multiple data encryption keys.

The target key management engine 112 encrypts (at 212) the retrieved data encryption key. The encrypted data encryption key is sent (at 214) from the target key management engine 112 to the host key engine 122.

Upon receipt of the encrypted data encryption key, the host key engine 122 uses the private key 124 (FIG. 1) for the host system 104 to decrypt (at 216) the received encrypted data encryption key. The decryption produces a decrypted data encryption key.

The host system 104 then uses the decrypted data encryption key to encrypt data or decrypt data (at 218) for respective write and read operations.

During a write operation, the decrypted data encryption key is used by the host system 104 to encrypt write data to provide encrypted data-in-flight that is sent by the host system 104 to the storage system 102 over the network 106. Note that in some examples, the encryption of the data-in-flight is not performed at the transport layer of the host system 104, but at a different layer above the transport layer. The storage system 102 then stores the encrypted write data in the storage device(s) 108 (FIG. 1), without having to first decrypt the encrypted write data. Thus, the decrypted data encryption key is used to both provide protection for data-in-flight and data-at-rest. As a result, a single data encryption key managed by the storage system 102 is used for both data-in-flight and data-at-rest protection.

During a read operation, the storage controller 110 (FIG. 1) in the storage system 102 retrieves encrypted data from the storage device(s) 108, and sends the encrypted data (without first decrypting the encrypted data) to the requesting host system 104 over the network 106. The requesting host system 104 then decrypts the received encrypted data using the decrypted data encryption key.

In some examples, because the storage system 102 manages a data encryption key for use by a host system 104, an authorization of the host system 104 is performed prior to the storage system 102 sending the data encryption key to the host system 104. Any of various techniques can be used to authorize the host system 104.

An example technique to authorize the host system 104 is to use a technique in which the host system 104 that has been granted to access a specific storage object (or collection of storage objects) is also given access to the data encryption key for the storage object (or collection of storage objects). For example, an administrative interface of the storage system 102 may be used by an administrator to configure the storage system 102 so that the storage system 102 provides specific host systems access to just a collection of storage objects the host systems are authorized to access.

Alternatively, a certificate-based authorization technique can be used, in which the host system 104 sends a certificate to the storage system 102, which can authorize the host system 104 based on the certificate. Other example authorization techniques can be used in other examples.

In some examples, the storage system 102 may decrypt encrypted data to provide data services, such as to perform deduplication, data compression, and so forth. In such examples, a host system 104 can send an identifier associated with the host system 104 to the storage system 102, which can use the identifier to obtain the corresponding data encryption key, such as from the key repository 116 of the key manager system 114, or from a storage device or a memory of the storage system 102. The storage system uses the obtained data encryption key to decrypt encrypted data stored by the storage system 102, to provide the data services.

In further examples, a host system 104 may be given some control over whether or not the storage system 102 is allowed to decrypt encrypted data. This can be accomplished by the host system 104 sending a key identifier of the data encryption key to be used to decrypt the encrypted data. If the host system 104 does not send the key identifier, then the storage system 102 does not decrypt the encrypted data.

Figure 3:
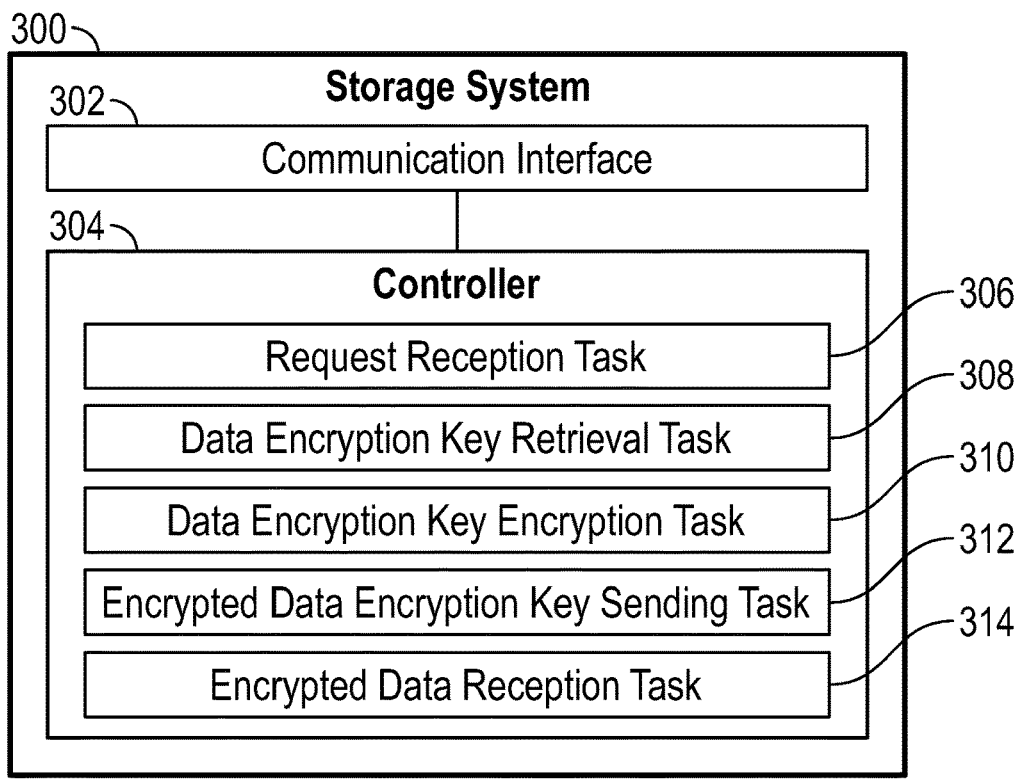
FIG. 3 is a block diagram of a storage system according to some examples.

FIG. 3 is a block diagram of a storage system 300, such as the storage system 102 of FIG. 1. The storage system 300 includes a communication interface 302 to communicate with a host system (e.g., 104 in FIG. 1 or 400 in FIG. 4) that is able to access data stored by the storage system 300. The communication interface 302 can include a transceiver to send and receive signals over a network (e.g., 106 in FIG. 1). Also, the communication interface 302 can further include protocol layers that manage the communication of data according to respective communication protocols, such as the Internet Protocol (IP), Transmission Control Protocol (TCP), and so forth.

The storage system 300 includes a controller 304 (e.g., the storage controller 110 of FIG. 1) to perform various tasks. The tasks of the controller 304 can include a request reception task 306 that receives a request for a data encryption key from the host system. This request can include a message containing a public key and/or an identifier associated with the host system or a storage object.

The tasks further include a data encryption key retrieval task 308 that, in response to the request, retrieves, from a key manager system (e.g., 114 in FIG. 1), a data encryption key for the host system. Note that the retrieved data encryption key can be associated with an individual host system, a cluster of host systems, an individual storage object, or a collection of storage objects.

The tasks further include a data encryption key encryption task 310 that encrypts the data encryption key retrieved from the key manager system using a first key (e.g., a public key of the host system), to produce an encrypted data encryption key. In some examples, the first key can be received by the storage system 300 from the host system.

The tasks further include an encrypted data encryption key sending task 312 that sends the encrypted data encryption key to the host system.

The tasks further include an encrypted data reception task 314 that receives, from the host system, encrypted data encrypted using the data encryption key. The encrypted data is encrypted using the data encryption key determined by the host system from the encrypted data encryption key by decrypting the encrypted data encryption key using a second key (e.g., a private key) of the host system.

The storage system 300 can store the received encrypted data in a storage medium of the storage system 300, without having to first decrypt the received encrypted data. In this manner, a single data encryption key can be used to protect both data-in-flight and data-at-rest.

In some examples in which the storage system 300 provides a data service (e.g., data compression, etc.), the storage system 300 can decrypt encrypted data associated with the data service if the storage system 300 receives, from the host system, information associated with the data encryption key as part of an access (write or read) of data by the host system. The data service includes any type of service (such as compression) that is to be applied on decrypted data. The storage system 300 decrypts the encrypted data associated with the data service in response to receiving the information associated with the data encryption key.

In some examples, the information associated with the data encryption key comprises a key identifier of the data encryption key. For example, for a write initiated by the host system, the storage system 300 receives encrypted data (encrypted using the data encryption key) from the host system. The storage system 300 also receives the key identifier from the host system. Based on the key identifier, the storage system 300 obtains the corresponding data encryption key (which may have been stored at the storage system 300). The storage system 300 decrypts the encrypted data using the data encryption key, and applies a data service (e.g., compression) on the decrypted data. The data service applied on the decrypted data produces processed data (e.g., compressed data). The storage system 300 then encrypts the processed data to produce encrypted processed data, which is then written to the storage medium of the storage system 300.

In response to a read initiated by the host system, the storage system 300 uses the key identifier provided by the host system to obtain the corresponding data encryption key. The storage system 300 reads encrypted processed data from the storage medium of the storage system 300, and decrypts the encrypted processed data. The decryption of the encrypted processed data produces decrypted processed data (e.g., decrypted compressed data). The storage system 100 then reverses the data service (e.g., performs decompression) on the decrypted compressed data, to produce unprocessed data (e.g., uncompressed data). "Unprocessed data" refers to data on which the data service has not been applied, or for which the data service has been reversed. The storage system 300 then encrypts the resulting data using the data encryption key, to produce encrypted unprocessed data, which is sent by the storage system 300 to the host system.

The host system can decrypt the encrypted unprocessed data using the data encryption key.

In both the write and read examples noted above, the controller 304 may not perform decryption of encrypted data (encrypted data received from the host system in a write, or encrypted processed data retrieved from the storage medium of the storage system 300 in a read) if the host system does not provide the information associated with the data encryption key (e.g., key identifier) to the storage system 300.

Note also that if the storage system 300 does not perform a data service, then the storage system 300 would not perform the decryption noted above for a write or read operation.

In further examples, the information associated with the data encryption key comprises an identifier associated with the host system.

Figure 4:
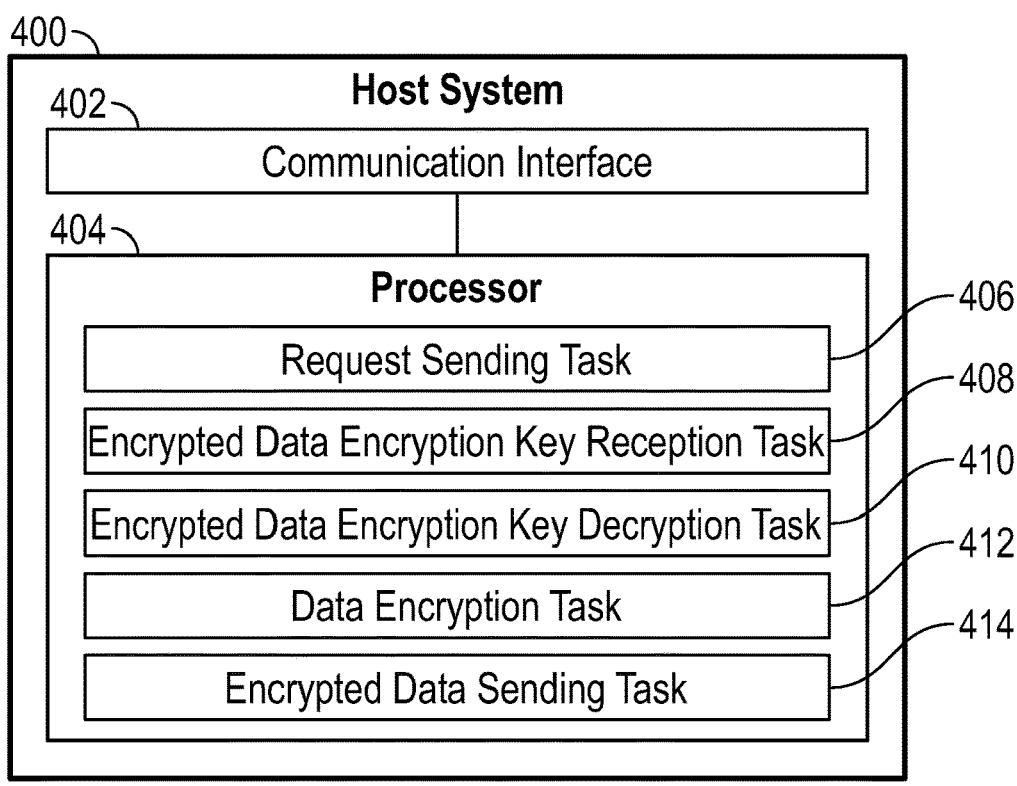
FIG. 4 is a block diagram of a host system according to some examples.

FIG. 4 is a block diagram of a host system 400, such as the host system 104 of FIG. 1. The host system 400 includes a communication interface 402 to communicate with a storage system (e.g., the storage system 102 of FIG. 1 or the storage system 300 of FIG. 3).

The host system 400 includes a hardware processor 404 (or multiple hardware processors). A hardware processor can include a microprocessor, a core of a multi-core microprocessor, a microcontroller, a programmable integrated circuit, a programmable gate array, or another hardware processing circuit.

The hardware processor 404 can perform various tasks. A hardware processor performing a task can refer to a single hardware processor performing the task or multiple hardware processors performing the task. In some examples, the tasks of the hardware processor 404 may be performed by machine-readable instructions executable on the hardware processor 404. Machine-readable instructions executable on a hardware processor can refer to the instructions executable on a single hardware processor or the instructions executable on multiple hardware processors.

The tasks of the hardware processor 404 include a request sending task 406 that sends a request for a data encryption key to the storage system.

The tasks of the hardware processor 404 further include an encrypted data encryption key reception task 408 that, in response to the request, receives, at the host system 400 from the storage system, an encrypted data encryption key produced by encrypting, using a first key of the host system, the data encryption key retrieved by the storage system from a key manager system in response to the request.

In some examples, the first key is a public key sent by the host system 400 to the storage system.

The tasks of the hardware processor 404 further include an encrypted data encryption key decryption task 410 that decrypts, using a second key, the received encrypted data encryption key, to produce a decrypted data encryption key. In some examples, the second key is a private key of the host system 400.

The tasks of the hardware processor 404 further include a data encryption task 412 that encrypts, using the decrypted data encryption key, data to produce encrypted data for a write operation.

The tasks of the hardware processor 404 further include encrypted data sending task 414 for the write operation that sends, to the storage system, the encrypted data for storage at a storage medium of the storage system.

In some examples, the hardware processor 404 is part of a smart NIC, or the hardware processor 404 is to execute a storage driver to perform the tasks 406, 408, 410, and 412.

For a read operation, the hardware processor 404 can receive encrypted data from the storage system, and decrypts the received encrypted data using the decrypted data encryption key.

Figure 5:
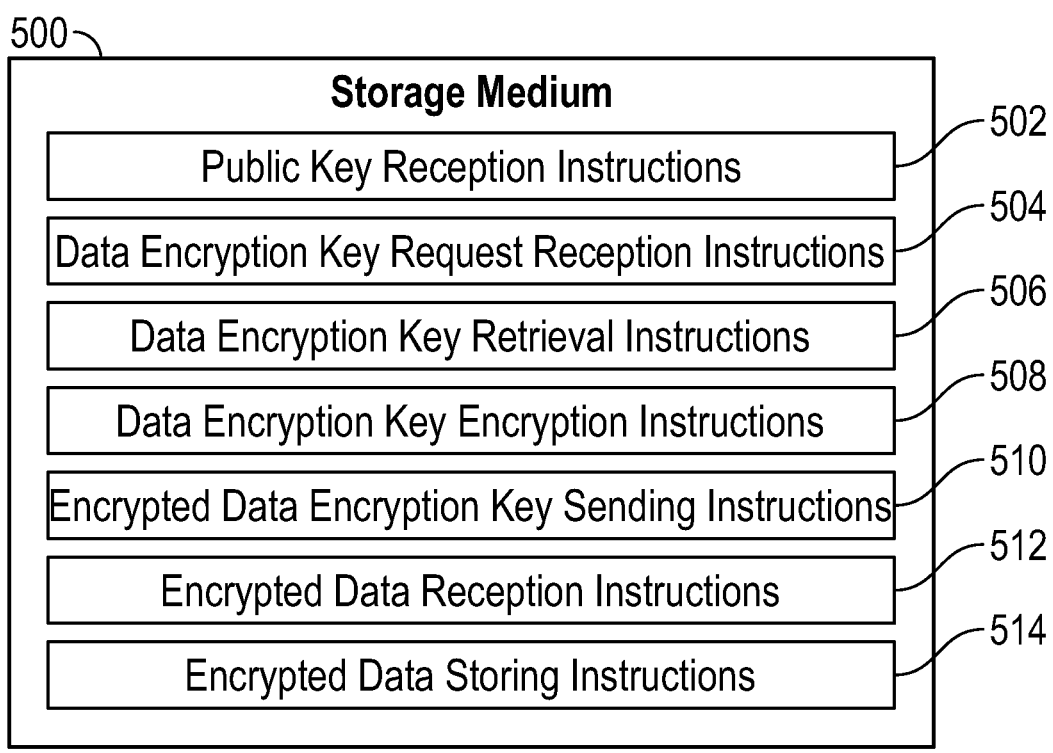
FIG. 5 is a block diagram of a storage medium storing machine-readable instructions according to some examples.

FIG. 5 is a block diagram of a non-transitory machine-readable or computer-readable storage medium 500 storing machine-readable instructions that upon execution cause a storage system (e.g., 102 in FIG. 1 or 300 in FIG. 3) to perform various tasks.

The machine-readable instructions include public key reception instructions 502 to receive a public key from a host system (e.g., 104 in FIG. 1 or 400 in FIG. 4).

The machine-readable instructions further include data encryption key request reception instructions 504 to receive a request for a data encryption key from the host system.

The machine-readable instructions further include data encryption key retrieval instructions 506 to, in response to the request, retrieve, from a key manager system, a data encryption key for the host system.

The machine-readable instructions further include data encryption key encryption instructions 508 to encrypt the data encryption key using the public key, to produce an encrypted encryption key.

The machine-readable instructions further include encrypted data encryption key sending instructions 510 to send the encrypted data encryption key to the host system.

The machine-readable instructions further include encrypted data reception instructions 512 to receive, from the host system, encrypted data encrypted using the data encryption key determined by the host system by decrypting the encrypted data encryption key using a private key of the host system.

The machine-readable instructions further include encrypted data storing instructions 514 to store the encrypted data in a storage medium of the storage system.

A storage medium (e.g., 500 in FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A storage system comprising:
a communication interface to communicate with a host system that is able to access data stored by the storage system; and
a controller to:
receive a request for a data encryption key from the host system over a network, the request comprising an identifier of the host system or an identifier of a storage object to be accessed;
in response to the request, retrieve, from a key manager system, the data encryption key for the host system, wherein the controller is to retrieve the data encryption key for the host system from the key manager system by sending, to the key manager system, a request including a key identifier that is based on the identifier of the host system or the identifier of the storage object to be accessed, and wherein the storage system is separate from each of the host system and the key manager system;
encrypt the data encryption key retrieved from the key manager system using a first key, to produce an encrypted data encryption key;
send the encrypted data encryption key to the host system; and
receive, from the host system, encrypted data encrypted using the data encryption key.

2. The storage system of claim 1, wherein the encrypted data encryption key is sent to a network interface controller or a storage driver of the host system, and wherein the encrypted data received from the host system is encrypted by the network interface controller or the storage driver using the data encryption key.

3. The storage system of claim 1, wherein the controller is to translate the identifier of the host system to the key identifier included in the request sent to the key manager system.

4. The storage system of claim 1, wherein the controller is to translate the identifier of the storage object to the key identifier included in the request sent to the key manager system.

5. The storage system of claim 1, wherein the controller is to look up the key identifier included in the request sent to the key manager system from the identifier of the host system or the identifier of the storage object.

6. The storage system of claim 1, wherein the first key is from the host system and is a public key of the host system.

7. The storage system of claim 6, wherein the encrypted data is encrypted using the data encryption key determined by the host system from the encrypted data encryption key by decrypting the encrypted data encryption key using a private key of the host system.

8. The storage system of claim 1, wherein the data encryption key retrieved by the storage system from the key manager system is obtained by the key manager system by accessing a key repository that correlates key identifiers to corresponding data encryption keys, wherein the key identifier included in the request from the storage system to the key manager system correlates to the data encryption key in the key repository.

9. The storage system of claim 1, wherein the controller is to:
receive, from the host system, information associated with the data encryption key as part of an access of data by the host system; and
decrypt encrypted data associated with a data service of the storage system in response to receiving the information associated with the data encryption key.

10. The storage system of claim 9, wherein the information associated with the data encryption key comprises the key identifier of the data encryption key.

11. The storage system of claim 10, wherein the controller does not decrypt the encrypted data associated with the data service if the host system does not provide the information associated with the data encryption key as part of the access of data by the host system.

12. The storage system of claim 9, wherein the information associated with the data encryption key comprises the identifier of the host system.

13. The storage system of claim 1, wherein the controller is to manage access of the data encryption key responsive to the request for the data encryption key based on whether the host system is authorized.

14. A method of a storage system comprising a hardware processor, comprising:

receiving, at the storage system, a first key from a host system;

receiving, at the storage system, a request for a data encryption key from the host system, the request comprising an identifier of the host system or an identifier of a storage object to be accessed by the host system;

in response to the request, sending, from the storage system over a network to a key manager system, a key identifier for the data encryption key, the key identifier being based on the identifier of the host system or the identifier of the storage object to be accessed, wherein the storage system is separate from each of the host system and the key manager system;

receiving, at the storage system over the network from the key manager system, the data encryption key obtained by the key manager system by accessing a key repository that correlates key identifiers to corresponding data encryption keys, wherein the key identifier sent from the storage system to the key manager system correlates to the data encryption key in the key repository;

encrypting, at the storage system, the data encryption key using the first key, to produce an encrypted data encryption key;

sending the encrypted data encryption key from the storage system to the host system; and receiving, at the storage system from the host system, encrypted data encrypted using the data encryption key derived by the host system based on decrypting the encrypted data encryption key.

15. The method of claim 14, wherein the first key is a public key.

16. The method of claim 15, wherein the encrypted data is encrypted using the data encryption key derived by the host system based on decrypting the encrypted data encryption key with a private key.

17. The method of claim 14, further comprising:

receiving, from the host system, information associated with the data encryption key as part of an access of data by the host system; and decrypting, by the storage system, encrypted data associated with a data service of the storage system in response to receiving the information associated with the data encryption key.

18. A non-transitory machine-readable storage medium comprising instructions that upon execution cause a storage system to:

receive a public key from a host system;

receive, at the storage system, a request for a data encryption key from the host system, the request comprising an identifier of the host system or an identifier of a storage object to be accessed by the host system;

in response to the request, send, from the storage system over a network to a key manager system, a key identifier for the data encryption key, the key identifier being based on the identifier of the host system or the identifier of the storage object to be accessed by the storage system, wherein the storage system is separate from each of the host system and the key manager system;

receive, at the storage system over the network from the key manager system, the data encryption key obtained by the key manager system by accessing a key repository that correlates key identifiers to corresponding data encryption keys, wherein the key identifier sent from the storage system to the key manager system correlates to the data encryption key in the key repository;

encrypt the data encryption key using the public key, to produce an encrypted data encryption key;

send, from the storage system, the encrypted data encryption key to the host system;

receive, from the host system, encrypted data encrypted using the data encryption key derived by the host system based on decrypting the encrypted data encryption key using a private key of the host system; and store the encrypted data in a storage medium of the storage system.

19. The non-transitory machine-readable storage medium of claim 18, wherein the instructions upon execution cause the storage system to:

manage access of the data encryption key responsive to the request for the data encryption key based on whether the host system is authorized.

* * * * *